United States Patent

[11] 3,620,383

[72] Inventors David John Ingram
40 Edendale Road, Barnhurst, Kent;
Geoffrey James Eagles, 31 Tradescant
Drive, Meopham, Kent, both of England
[21] Appl. No. 6,271
[22] Filed Jan. 27, 1970
[45] Patented Nov. 16, 1971
[32] Priority Feb. 14, 1966
[33] Great Britain
[31] 6,438/66
Continuation-in-part of application Ser. No. 614,977, Feb. 9, 1967, now abandoned. This application Jan. 27, 1970, Ser. No. 6,271

[54] BRICK-HANDLING APPARATUS
10 Claims, 10 Drawing Figs.
[52] U.S. Cl............................................................ 214/6 A,
294/62, 214/6 FS
[51] Int. Cl...................................................... B65g 57/04

[50] Field of Search........................................... 214/6, 6 A,
6 FS, 6 P; 294/62, 63, 64

[56] References Cited
UNITED STATES PATENTS
3,262,594 7/1966 Teago.......................... 214/6 A X
3,270,897 9/1966 Lingle......................... 214/6 A Primary Examiner—Gerald M. Forlenza
Assistant Examiner—Robert J. Spar
Attorney—Craig, Antonelli, Stewart & Hill ABSTRACT: Brick handling and stacking apparatus including a carriage mounted for movement on a gantry between a pickup station and a release station, a pickup head, mounted for vertical movement on a carriage, in the form of a plurality of platen members carried by support brackets slidably mounted on a horizontal support for movement to predetermined positions thereon, piston and cylinder units for moving the platen members along the support, and a plurality of stop members disposed at spaced positions adjacent the horizontal support.

BRICK-HANDLING APPARATUS

The present application is a continuation-in-part of our copending application Ser. No. 614,977, filed on the 9th day of Feb. 1967, now abandoned.

This invention relates to brick-handling apparatus for progressively building up layers of bricks to forms packs, and has particular though not exclusive application to building up packs of unfired bricks upon kiln cars in such patterns that the maximum cross sections of the kilns through which the packs are to be passed are utilized.

Such apparatus is described, for example, in U.S. Pat. Nos. 3,262,594 and 3,297,171.

It is an object of this invention to provide an improved brick-handling apparatus of the kind referred to incorporating a simple yet effective means for controlling the spacing of the bricks as the packs are built up and which has other advantages as will be apparent from the following description.

According to the present invention there is provided a brick-handling apparatus comprising a carriage mounted on a gantry for movement between a pickup station and a release station, and a pickup head comprising a plurality of aligned platen members capable of picking up a selectively predetermined number of bricks disposed in longitudinal alignment at the pickup station and of releasing them at the release station wherein the platen members are carried by support brackets which are slidably mounted on a horizontal support to permit the platen members to be moved from their pickup positions on the support to spaced positions along the support, driving means including piston and cylinder units each associated with a group of at least one support bracket and coupled thereto through a rope and pulley system for producing said movement of the platen members along the support following the engagement of the bricks by the platen members, and stop means incorporating a plurality of axially fixed stop members disposed at spaced positions adjacent the support for arresting the platen members in positions corresponding to the spaces required between the bricks released at said release station.

Such an arrangement enables an optimum spacing between the bricks forming the layers of the pack to be readily achieved, for example, to provide adequate clearances between the bricks to encourage air circulation through the packs as they pass through the kilns. In addition, splits of required dimensions may be readily formed in the packs at desired places to further encourage said air circulation.

Preferably the stop means is in the form of a bar extending parallel to the support and having the stop members disposed along it.

Conveniently, the stop bar may have a plurality of lines of stop members having different sets of spacings disposed around its axis, and the stop bar may be rotatably mounted to permit an appropriate line of stop members to be brought into an operative position for arresting the platen members in positions corresponding to the spacing of the stop members in that line.

Any suitable drive means capable of producing the required movement of the platen members may be employed which permits the members to be stopped in turn, either singly or in groups, by the respective stop members whilst allowing the movement of the remainder of the members to continue until all have been arrested in their required spaced positions.

The arrangement may include drive means common to two or more support brackets and arranged so as to permit the brackets to be stopped in turn by the respective stop members while allowing the movement of the remaining bracket or brackets to continue until all have been arrested in their required spaced positions.

The drive means may include a drive member common to said two or more support brackets and a differentially acting pulley system designed to provide a continuous drive to the respective support brackets while permitting each to be stopped in turn by its respective stop member.

By differentially acting pulley system of pulleys with associated ropes, cables, chains or the like (hereinafter referred to simply as ropes) which permits a differential action to be achieved.

The platen members may be pivoted to the support brackets so that they are capable of movement through 90° between a horizontal plane and a vertical plane so that the bricks carried thereby may be set down on their faces or edges at the release station as may be desired.

Each platen member may conveniently be provided with at least one vacuum pickup pad, the pads forming a line of pads extending parallel to the support bar and adapted to selectively pick up bricks from a line of bricks presented at the pickup station and to set the bricks down in a line at the release station; however, mechanical pickup means similarly arranged in a line may be alternatively or additionally provided if desired.

Thus, it will be appreciated that a brick pack would be built-up progressively in layers and that each layer would be progressively formed by a number of adjacent lines of bricks by appropriate positioning of the carriage over the release station.

Conveniently the number of movements of the carriage and pickup head between the pickup station and release station to form a complete layer of bricks may be reduced by providing a plurality of lines of pickup pads on the platen members which are in fixed spaced relationship depending upon the spacing required between the adjacent lines of bricks in the layers in which case a corresponding and cooperating plurality of lines of bricks would be present at the pickup station.

It will be appreciated with this last mentioned feature that if for any reason it is required to vary the spacing between the plurality of lines of bricks which would normally be picked up at the pickup station, then the lines of bricks would be laid at the release station one line at a time and the required spacing between the lines would be controlled by appropriate positioning of the carriage over the release station.

In practice, particularly where adjacent lines of the layers of bricks have spaces therebetween, it is frequently desirable to build up the layers of bricks so that they alternate the direction of their lines, the layers then coacting with each other to form a solid pack, and thus it is desirable to provide for relative rotation in horizontal plane between the pickup head and the pack of bricks being formed. This is achieved in the apparatus described in U.S. Pat. Nos. 3,262,594 and 3,297,171 by providing for rotation of the head in a horizontal plane. Not only does this mean that a further mechanism has to be associated with the pickup head to achieve this motion but also that the carriage carrying the head requires at least two directions of travel on the gantry in order to build up the adjacent lines of bricks of the layers. Conveniently a further feature of this invention lies in the provision of a rotatable platform situated at the release station which can be indexed to any number of desired angular positions relative to the pickup head.

Thus, it will be appreciated that such a platform not only dispenses with the further mechanism for the pickup head but also dispenses with the need to provide for movement of the carriage in at least two horizontal directions, since the adjacent lines of bricks of a layer can be built-up irrespective of the direction of the lines by appropriate indexing of the platform.

Further, the rotatable platform may be capable of vertical up and down movement so that the layers of bricks may be formed by raising the turntable to a position near to the horizontal plane of the pickup head, and then progressively lowering the turntable in steps as each layer is formed by an amount equivalent to the depth of the bricks of each layer. Such an arrangement would dispense with the need to provide a relatively long vertical movement of the pickup head, which would then need only a relatively short vertical movement for engagement of the bricks presented at the pickup station.

Conveniently the arrangement includes at the pickup station a line of support members on to which a corresponding number of bricks are arranged to be fed from one end of the line in abutting relationship, stop means being provided for arresting the movement of the bricks when the leading brick reaches the furtherest support member, so that prior to pickup each member then supports a respective brick.

However, it is necessary to space the bricks apart slightly in order to bring each under a respective platen member at the pickup position, the arrangement then conveniently also including separating means for producing a uniform separation of the support members when the bricks are supported thereby so as to space apart the bricks to positions corresponding to the pickup positions of the aligned platen members on their support.

If the bricks were always of precisely uniform dimensions this would present no difficulty since the support members could always be separated by a fixed amount selected to bring each brick under a respective platen member. However, in general, the manufacturing tolerances of the brick dimensions are such that this is not normally possible. Preferably, therefore, the separating means includes a first drive member designed to move said furthest support member in the direction of feed of the bricks so as to produce an initial separation of the support members, means for stopping said movement when the brick supported by said furthest support member occupies a position corresponding to the pickup position of the respective platen member, and for holding the support member in this position, a second drive member designed to move the support member at the opposite end of the line in the opposite direction to produce a further separation of the support members, means for arresting said movement when the brick supported by said opposite end support member occupies a position corresponding to the pickup position of the respective platen member, and means coupling the support members which permits them to be separated but maintains a uniform spacing between them.

By this means the support members are always separated by an amount related to the length of the bricks so that each brick is brought under a respective platen member on the pickup head.

To ensure that the support members are uniformly separated to give a uniform spacing between the bricks for different brick dimensions the supports may be coupled by a lazy-tong system of coupling, or alternatively adjacent pairs of support members may be connected by equally tensioned spring couplings.

In some cases the bricks may be fed to the pickup station on edge whereas the faces of the bricks are required to be presented to the platens of the pickup head. In order to achieve this the pickup station conveniently includes a main support of L-shape in cross section with the horizontal limb of the support providing a conveyor along which the bricks are arranged to be fed, the support members being carried by the upright of the support and the arrangement being such that when the desired number of bricks have been fed on to the pickup station, the main support is pivoted upwards about a horizontal axis to cause the bricks to rest on the respective support members, the separation of the support members then being effected as above described.

Conveniently the pickup station includes two lines of support members designed to receive two lines of bricks, the pickup head then including platen members designed to engage either one or both of the two lines of bricks as may be desired.

In order that the invention may be more readily understood and further features made apparent one embodiment of brick-handling apparatus constructed in accordance with the invention will now be described, by way of example, with reference to the accompanying drawings in which.

Figure 3:
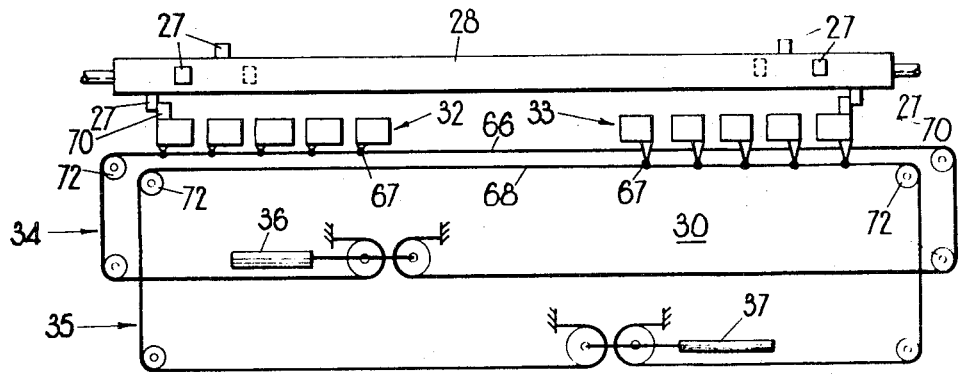
Figure 4:
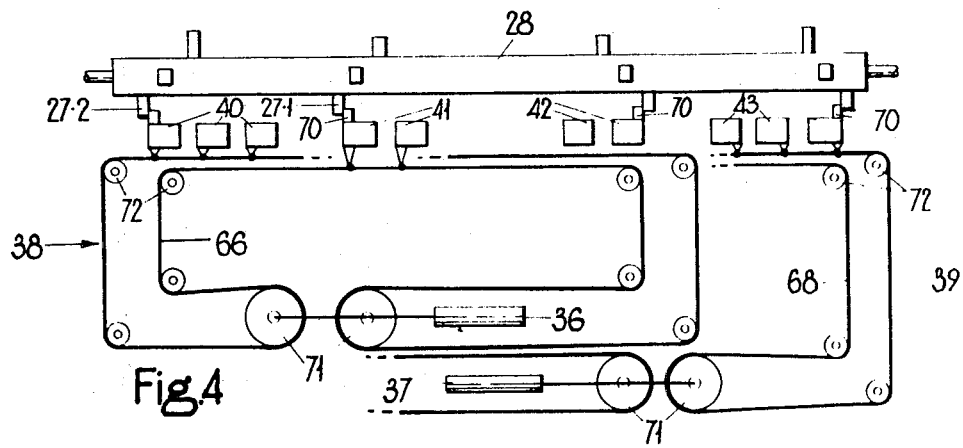
Figure 5:
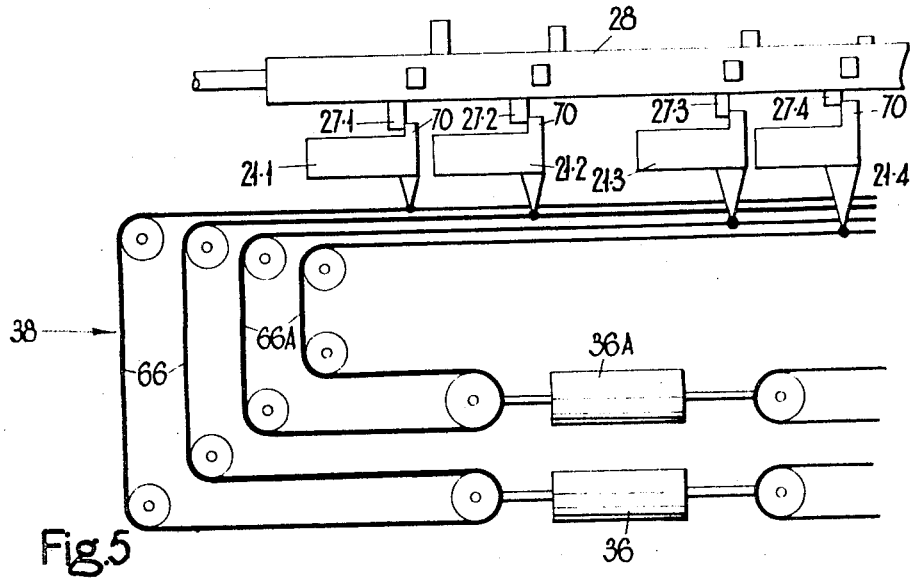
Figure 6:
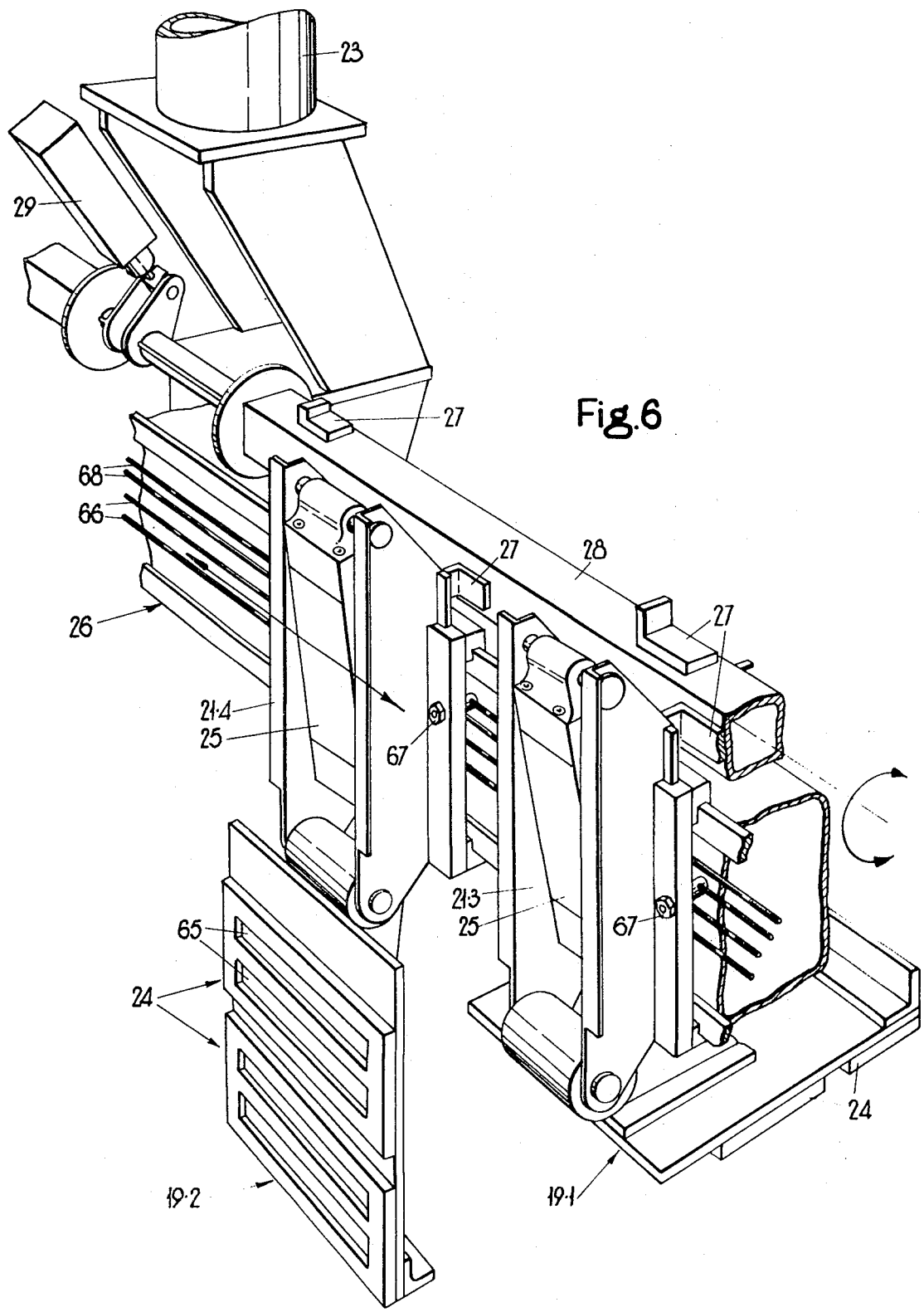
Figure 7:
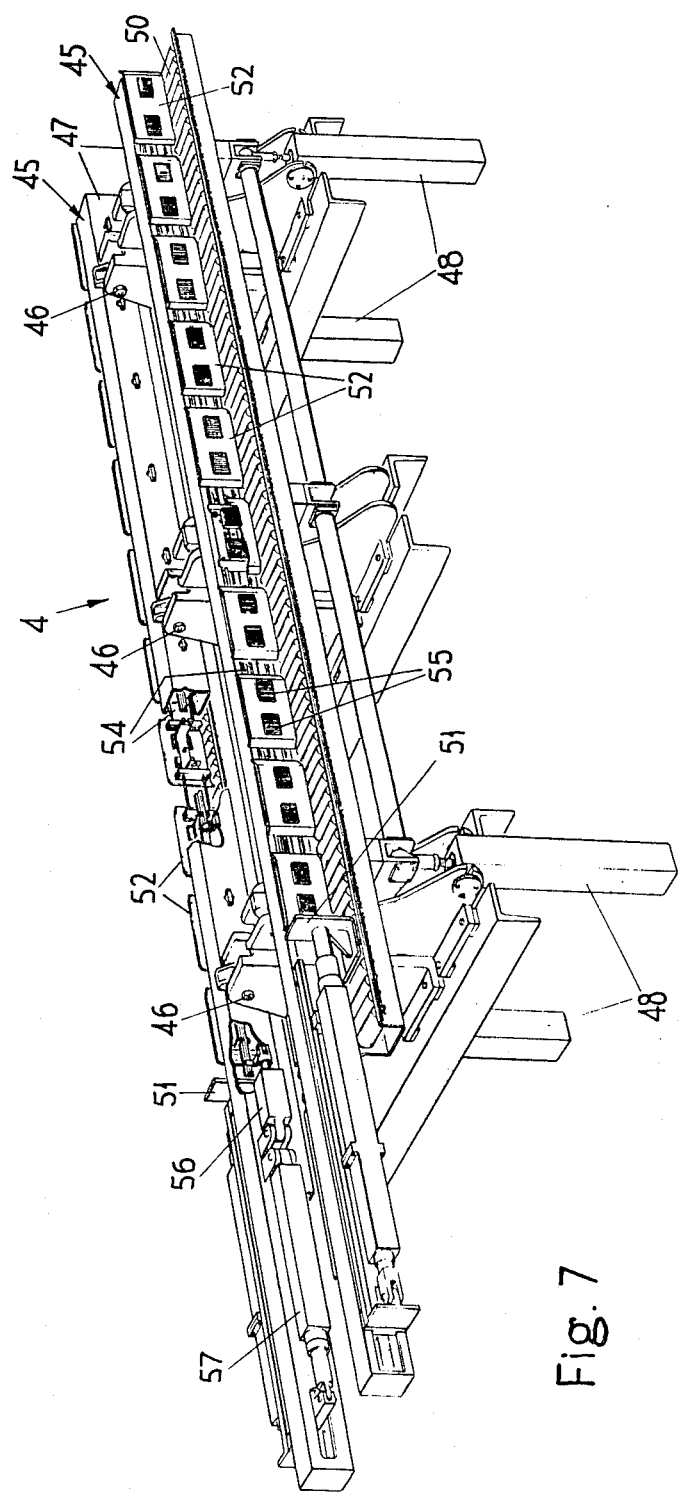

FIG. 3, shows diagrammatically one form of drive unit associated with the pickup head, FIGS. 4 and 5 show, also diagrammatically, two modified forms of drive arrangement, FIG. 6 is an enlarged perspective view of part of the pickup head modified for use with the drive arrangement of FIG. 5, FIG. 7 is a perspective view of the pickup station, and FIGS. 8 to 10 illustrate the operation of the pickup station in diagrammatic form.

Figure 1:
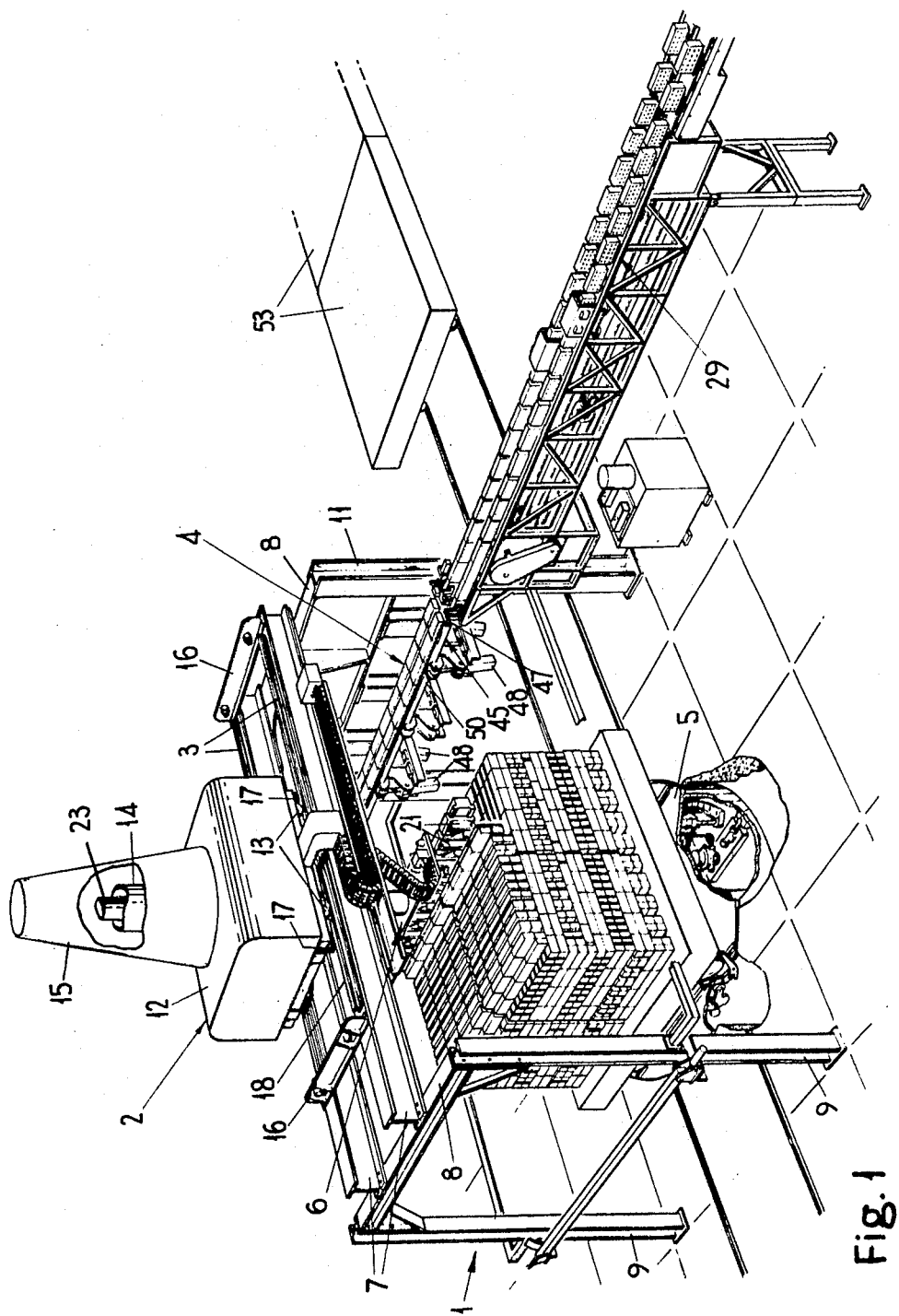
FIG. 1 is a perspective view of the machine.

Referring to FIG. 1, the apparatus comprises essentially a gantry 1, a carriage 2 traversable along the gantry on rails 3 between a pickup station 4 and a release station defined by a rotatable platform 5, the top of which lies flush with the ground over which the gantry is mounted, and a pickup head 6 carried by the carriage 2.

The gantry 1 is the form of an open framework comprising a pair of main horizontal girders 7 which extend parallel to each other and provide the support for the rails 3, a pair of transverse girders 8 supporting the ends of the girders and two pairs of uprights 9 and 11 which support the ends of the girders 8 and hence the girders 7 clear of the ground.

The carriage 2 comprises a rectangular support housing 12 which is provided with rail wheels 13 and a vertical tube 14 which extends through the housing 12 into a conical housing 15 mounted on top of the latter. The carriage is arranged to be driven along the rails 3 between limits in the form of overrun buffers 16 by two drive motors (not shown) mounted in the housing 12 via a rack and pinion gear arrangement, there being a pinion 17 associated with each motor which is arranged to engage a common rack 18 which extends along one of the girders 7 adjacent its rail 3.

Figure 2:
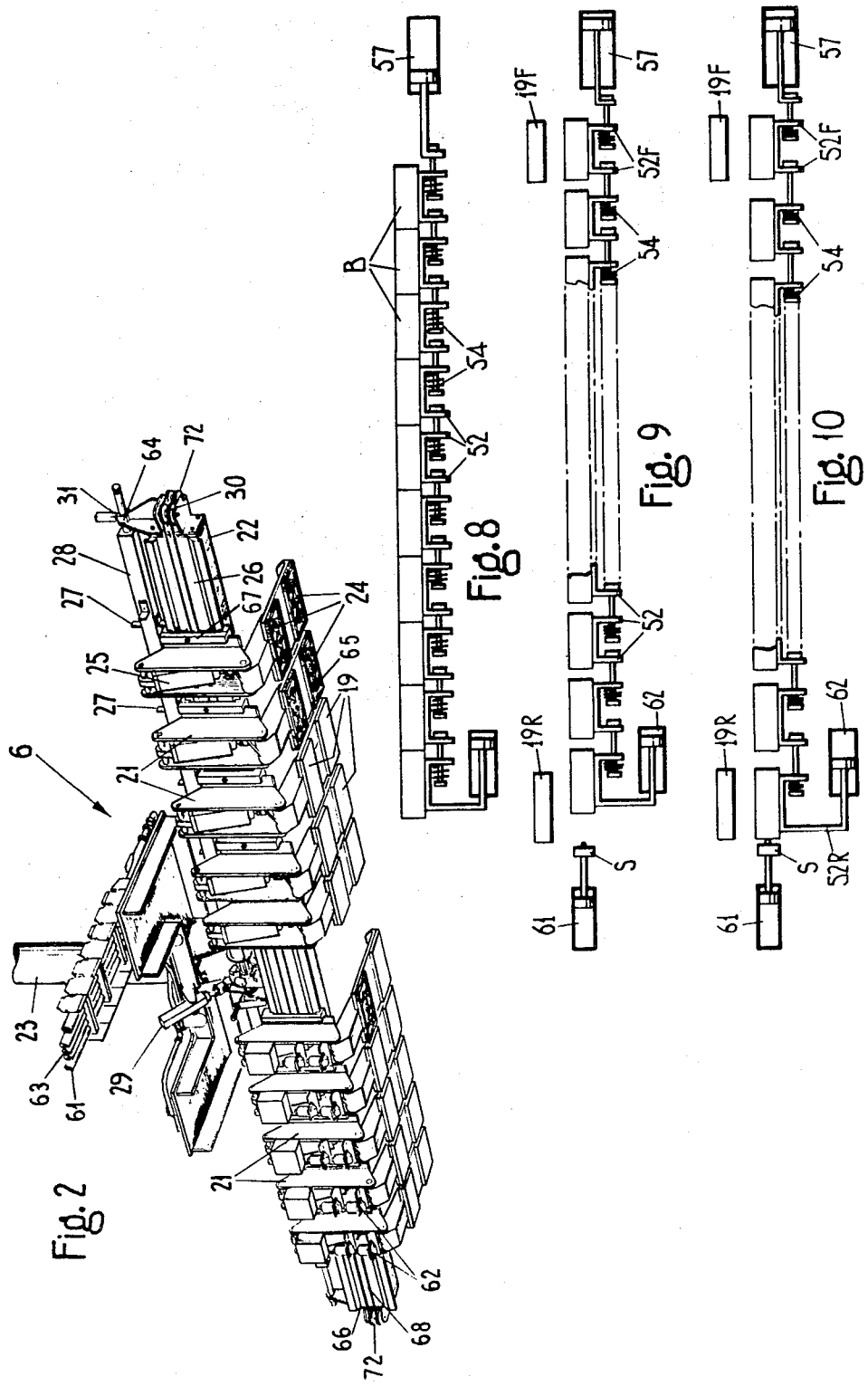
FIG. 2 is an enlarged perspective view of the pickup head.

Referring also to FIG. 2, the pickup head 6 comprises generally ten aligned plate members 19 pivoted to individual support brackets 21 in which in turn are mounted for longitudinal sliding movement on a horizontal support bar 22. The support bar 22 is mounted centrally of its length to the lower end of a vertical mast 23 which is slidably mounted in the tube 14 of the carriage 2. The mast 23 is arranged to be driven up and down in the tube 14 by a suitable hydraulic drive system conveniently incorporating means for changing the speed of movement of the mast so that the pickup head may be lowered at a fast rate to the vicinity of the pickup station or the level at which bricks are to be released and thereafter at a slow rate to bring the pickup head into engagement with bricks presented at the pickup station or to the level at which the bricks are to be released. The mast 23 is nonrotatably mounted in the tube 14 such that the support bar 22 extends transversely to the run of the girders 7. Each platen 19 is in the form of a rectangular plate carrying a pair of rectangular vacuum pickup pads 24 each adapted to engage a brick presented to it at the pickup station as will subsequently be described;

for this purpose each pad is provided in its operative surface with openings 65 which are connected to a suction pump (not shown) via electrically operated valve means 62 (only some of which are shown) associated with the respective pickup pads, and a flexible suction line 61. The platens are thus capable of releasably supporting a pair of bricks, the pads 24 of each pair being slightly spaced from each other to form two lines of pads, thereby enabling the pickup head to releasably support two parallel lines of bricks in slightly spaced relationship. The lines of bricks will normally be picked up at the pickup station by engagement of the pickup pads with one of their sets of faces, and in order that the bricks may be set down at the release station either on their other set of faces or on edge as required, the platens 19 are similarly pivoted at one of their ends to their support brackets 21 so as to be capable of movement through 90° from a horizontal plane to a vertical plane, this being shown more clearly in FIG. 6; a piston and cylinder drive unit 25 is connected between each platen 19 and its support member 21 for achieving this movement.

The electrically operated valve means 62 enable the number of bricks picked up by the pickup head to be varied as desired, by controlling the suction to the different pickup pads 24, the valve means being selectively operable remotely by any convenient electrical control switch system connected to the valve means 62 by flexible electric cables 63.

The support brackets 21 are mounted on the support bar 22 via slides 26 so as to be capable of movement therealong. Suitable drive means illustrated in part at 30 and which will be described in more detail hereinafter, are provided for driving the support brackets in two groups of five along the support bar 22 in opposite direction symmetrically about the center-line of the support bar to spaced positions determined by one of four pairs of stop members 27. The two stop members of each pair are arranged in alignment on a respective side of a stop bar 28 of rectangular cross section which extends parallel with and adjacent to the support bar 22, the different pairs being disposed on different sides of the stop bar and the spacings between the members of each pair being chosen to cover a range of different spacings required between the two groups of support brackets 21;

the stop bar 28 is rotatably mounted in bearings 64 so that the appropriate pair of stop members 27 can be indexed by means of piston and cylinder unit 29 until they lie in an operative position in which they can engage cooperating stop engaging lugs 70 (FIGS. 3 to 5) carried by the upper end of the rear face of respective support brackets 21.

It will be appreciated that with the arrangement of groups of support brackets 21 described above, i.e., two groups of five, an equal number of bricks forming a line of bricks may be readily set down symmetrically about the centerline of the support bar 22, and in order that an odd number of bricks may also be set down symmetrically about centerline of the support bar, this latter is provided with a locking device 31 which can hold the stop bar 28 in either of two fixed longitudinal positions, i.e., centrally of the support bar 22 for an equal number of bricks or offset by half a brick length for an odd number of bricks.

A suitable drive unit for the arrangement is illustrated in diagrammatic form in FIG. 3. In this drive unit the two groups of five support brackets, which for convenience are denoted 32 and 33, respectively, and which are disposed on opposite sides of the centerline of the support bar, are each arranged to be moved as a complete assembly. In order to produce the movement of the bracket groups they are coupled in turn, via two separate single rope and pulley systems 34, 35, respectively, to double-acting piston and cylinder units 36, 37 located behind the support bar, the pistons rods of the units being connected to the brackets by means of ropes 66, 68 passing around pulleys 72 at the ends of the support bar. Thus, each of the brackets of group 32 is fixed by means of cable clamps 67 to a respective rope 66 of the system 34, each of the brackets of the group 33 being similarly clamped to the rope 68 of the other system 35. In operation the units 36, 37, are actuated to move the groups 32, 33, apart to spaced positions determined by respective pair of stop members 27, each stop member of the pair lying in the path of a cooperating lug on the outermost bracket of the respective group, and thereby arresting further movement of the group. The location of the stop members thus determine the spacing between the two groups of brackets and hence between the two groups of bricks deposited thereby; it will be appreciated that in this arrangement the spacing between the bricks deposited by the platens of each group of brackets remains unchanged, but the spacing between the two groups of bricks can readily be varied, as required, by rotating the stop bar to bring different pairs of stop members 27 into the operative position. Instead of the various brackets of a group being separately clamped to the respective cable only one bracket of the group may be so clamped, the other brackets of the group being connected to the said one bracket so as to move with it in any convenient manner, for example, by interconnecting links.

If, however, it is required to provide, say two-spaced groups on each side of the centerline of the support bar 22 then an arrangement as shown in FIG. 4 may be employed; this arrangement is somewhat similar to that previously described in that a pair of double-acting piston and cylinder units 36, 37 are located at the rear of the support bar 22 and are associated with ropes passing around pulleys at the ends of the support bar and connected to respective brackets by means of clamps 67.

However, in this arrangement two differentially acting rope and pulley systems 38 and 39 are used for controlling the movement of the brackets on opposite sides of the said centerline.

Thus, on one side of the centerline the support brackets are in two groups 40 and 41 and on the other side of the centerline the support brackets are in two further groups 42 and 43, respectively. Double-acting piston and cylinder units 36, 37 are employed, each associated with a continuous loop of rope 66, 68, respectively, the two loops being coupled to pulleys 71 attached to the ends of the respective piston rods and passing around pulleys 72 at the ends of the support bar as shown. One side of the loop of rope 66 of the system 38 is attached by means of clamps to brackets of the group 40, and the other side of the loop of rope is clamped to the brackets on the other group 41. Similarly, the two sides of the loop of rope 68 of the system 39 are each clamped to the support brackets of a respective group 42 and 43. To achieve the spacing required of the groups, the units 36 and 37 are actuated to move their respective groups apart away from the centerline as in the previous arrangement.

The stop bar in this arrangement, however, carries on each of its four sides a line of four stop members, two on each side of the centerline, and each arranged to engage a cooperating lug 70 on the outermost bracket of a respective group. Thus, referring to the system 38, as the two groups of brackets are moved outwards the lug 70 on the outer bracket of the innermost group 41 first engages stop 27.1 and the group of brackets is thereby arrested. However, the outer group 40 continues to move, through the differential action of the system, until the lug 70 on the outermost bracket engages the outer stop 27.2 causing this second group to be arrested at a spacing from the first group determined by the spacing of the two stop members 27.1 and 27.2. The spacing between support brackets of the same group will, however, remain the same since they are clamped to the same section of cable. The other system operates in the same way. The stop members 27 must, of course, be so arranged that they do not interfere with a group of brackets with which they are not associated. In order to achieve this the stops are of different length, as are the lugs 70, the arrangement being such that the lug of the outer bracket group 40 can pass by the stop 27.1 without being engaged by it.

In both arrangements described the double-acting piston and cylinder units are again actuated, following the release of the bricks by the pickup head, to return the groups of brackets to their original positions.

It will be appreciated that if more than two-spaced groups are required on each side of the centerline of the support bar 22, then the arrangement described with reference to FIG. 4 could be modified by adding appropriate pulleys in the rope and pulley systems to as to provide that number of cables in each system equivalent to the number of separate groups required to be spaced by the system, additional piston and cylinder units being provided where necessary, together with an appropriate number of stop members on the stop bar.

It will also be understood that single platens instead of groups of platens could be spaced along the support bar 22 by utilizing appropriate rope and pulley systems and piston and cylinder units, and one such arrangement is illustrated in part in FIG. 5.

This arrangement is similar to that illustrated in FIG. 4, but in this case a total of eight support brackets are employed, four on each side of the centerline, but only one side of the arrangement and the respective rope and pulley system is illustrated for the sake of clarity.

The respective differential rope and pulley system 38 in this case comprises two double-ended double-acting piston and cylinder units 36, 36A each associated with a loop of cable 66, 66A, respectively. Opposite sides of the loop of cable 66 are clamped to a respective one of the outer two brackets 21.1, 21.2, and opposite sides of the loop of cable 66A are clamped to a respective one of the inner two brackets 21.3, 21.4.

Associated with the brackets on the stop bar are corresponding sets of four stop members 27.1, 27.2, 27.3, 27.4, each of the brackets carrying a lug 70 engageable with a respective stop member.

The stops and bracket lugs 70 are of graduated length as shown so that the stop members do not interfere with the movement of the brackets with which they are not associated. Then in use of the arrangement as the support brackets are moved outwards by the respective piston and cylinder units, the brackets are stopped in turn by the respective stop members engaging the cooperating lugs, the brackets thus being spaced apart by amounts corresponding to the spacing of the stop members. In order to vary the spacing the stop bar can be rotated to bring other stop members into the operative position. The brackets carried by the support bar 22 on the opposite side of the centerline are similarly arrested in spaced positions by corresponding stop members 27 on the stop bar 28. FIG. 6 illustrates part of the arrangement showing the two innermost brackets on one side of the centerline and the cooperating stop members. In this Figure also one of the platens 19.1 is shown in the raised horizontal datum position into which the platens are pivoted for engagement with the bricks at the pickup station, and also for setting them down on their faces, and the platen 19.2 is shown in the vertical position into which the platens are pivoted for the setting down of the bricks on edge. Normally, of course, all the platens will be rotated together. In place of the piston and cylinder units other means of obtaining the required movement of the platens can, of course, alternatively be employed.

Referring now to FIGS. 1 and 7 of the drawings, the pickup station 4 comprises essentially a pair of longitudinal L-shaped members 45 disposed back-to-back and each member is pivoted at points 46 near to its upper edge of its vertical limb 47 so as to be capable of movement through 90° by piston and cylinder units 48 to a position in which the vertical limb of the "L" lies in a horizontal plane as shown in FIG. 1. Thus, in operation of the pickup station 4, the bricks are fed on edge and in two streams by a suitable conveyor attangement 29 (see FIG. 1) towards the station and are guided one stream into each of the horizontal limbs 50 of the L-shaped members 45 until the two streams butt against buffer stops 51 provided at suitable positions along the said members, said stops being movable to other selected positions depending upon the number of bricks required to form a line. The members 45 are then pivoted to their positions shown in FIG. 1 which has the effect of moving the bricks in an upward direction and at the same time turning them so that a set of their faces are uppermost, the bricks then resting on individual support members 52 provided in the front faces of the limbs 47.

It will be appreciated that the bricks B of the streams of bricks fed on the members 45 are in abutting relationship (see FIG. 8) and it is desirable to give clearance between these bricks prior to the pickup head operating to pick up the bricks. This is achieved by slidably mounting the support members 52 in any convenient manner on the front faces of the limbs 47 of the L-shaped members 45, and connecting the members 52 together by equally tensioned spring couplings 54. Further, each support member 52 is provided with a pair of gripping inserts 55 (FIG. 7) which are movable from an inoperative position within the faces of the members 52, to an operative position projecting from said faces to grip the bricks fed onto the members 52.

Thus, after the members 45 have been pivoted to their positions shown in FIG. 1, gripping cylinder 56 is operated to move the inserts 55 to their operative position thus gripping their respective bricks and thereafter a first splitting cylinder 57 is operated to pull the support members 52 apart (see FIG. 9) and to position the adjacent end support member 52F and the respective brick under the corresponding platen member 19F of the pickup head.

Referring now to FIG. 10, a switch S associated with each member 45 is brought into an operative position by means of hydraulic piston and cylinder unit 51. Then a further splitting cylinder 62 is operated to pull on the rear support member 52R thereby producing a further separation of the support members, this separation continuing until the last brick of the line engages the switch S. The brick carried by this support member is then correctly positioned for engagement with the respective platen member of the pickup head represented at 19R. The equally tensioned spring couplings 54 insure that the support members are uniformly spaced apart so that each of the bricks is similarly brought beneath a respective platen member.

In operation, the machine is required to build up packs of bricks onto kiln cars 53 (see FIG. 1) which are fed onto the rotatable platform 5 in turns as each pack of bricks is completed, and the complete cycle of operations required of the apparatus to successively build up packs of bricks onto the kiln cars is carried out automatically by a suitable digital control system and interlock system, these systems controlling the various driving mechanisms of the apparatus to achieve a desired setting pattern of the packs, the supply of bricks to the pickup station, and the movement of the kiln cars.

Thus, assuming a kiln car to be already in position on the rotatable platform, a complete cycle of operations required of the brick-handling machine would be as follows:

1. Two lines of bricks are fed to the pickup station, turned face upwards by the upward pivoting of the support members and then separated to bring them under the respective platen members as above described.

2. Then with the two groups of platens 19 in their closed pickup position symmetrically disposed about the center of the support bar 22, and the carriage 2 positioned over the pickup station 4, the pickup head 6 descends to engage the two lines of bricks presented at said pickup station.

3. Where bricks are required, vacuum is applied to the vacuum pads 24 of the platens.

4. Pickup head 6 rises to lift the two lines of bricks from the pickup station 4.

5. the support members 52 of the pickup station 4 are pushed together and the members 45 are turned down with bricks not required for this cycle, further bricks being fed on to the pickup station in readiness for the next cycle.

6. The stop bar 28 is indexed to its appropriate position giving the required line of stop members 27 for the longitudinal pattern required for the lines of bricks.

7. The carriage 2 is moved along its gantry 1 towards the platform 5 and during this movement, the drive arrangement 30 for the platens 19 is actuated to pull the two groups of platens outwards from the center of the support bar 22 to their spaced positions on the latter.

8. If required, when the carriage 2 has moved the pickup head 6 sufficiently far from the pickup station 4, the platens are turned down through 90° to enable bricks to be set down on edge.

9. The carriage is stopped at its appropriate position over the kiln car 53, and then pickup head 6 descends to the level of the layer being formed and the bricks are released by breaking the vacuum of the pads with compressed air.

10. When the lines of bricks have been released, the head rises.

11. The carriage 2 returns along the gantry 1 and during this movement the drive arrangement 30 operates to reset the platens 19 in their closed positions as in (2).

12. Operations (1) to (11) are then repeated until a layer comprising a preselected number of lines of bricks is completed.

13. Operations (1) to (12) are then repeated to from the next layer of bricks, but if the next layer of bricks is required to be laid with its lines of bricks extending transversely to the previous layer, the turntable 5 is first turned to its appropriate position.

We claim:

1. A brick-handling apparatus comprising:
   a carriage mounted on a gantry for movement between a pickup station and a release station,
   and a pickup head mounted for up and down movement on the carriage
   the pickup head comprising a plurality of aligned platen members capable of picking up a selectively predetermined number of bricks disposed in longitudinal alignment at the pickup station and of releasing them at the release station, wherein the platen members are carried by support brackets which are slidably mounted on a horizontal support to permit the platen members to be moved from their pickup positions of the support to spaced positions along the support, driving means including piston and cylinder units each associated with a group of at least one support bracket and coupled thereto through a rope and pulley system for producing said movement of the platen members along the support following the engagement of the bricks by the platen members, and stop means incorporating a plurality of axially fixed stop members disposed at spaced positions adjacent the support for arresting the platen members in positions corresponding to the spaces required between the bricks released at said release station.

2. A brick-handling apparatus according to claim 1, wherein said driving means includes at least two piston and cylinder units operable to produce a separation of the respective support brackets, and wherein said stop means is in the form of a bar extending parallel to the support and having the stop member disposed at fixed stop positions along it.

3. A brick-handling apparatus according to claim 2, wherein the stop bar has a plurality of lines of stop members having different sets of spacings disposed around its axis and the stop bar is rotatably mounted to permit an appropriate line of stop members to be brought into an operative position for arresting the platen members in positions corresponding to the spacing of the stop members in that line.

4. A brick-handling apparatus according to claim 3, wherein said driving means includes a drive member common to two or more support brackets and a differentially acting pulley system providing a continuous drive to the respective support brackets and permitting each to be stopped in turn by its respective stop member while allowing the movement of the remaining bracket or brackets to continue until all have been arrested in their required spaced positions.

5. A brick-handling apparatus according to claim 4, wherein the drive member comprises a double-acting hydraulic or pneumatic piston and cylinder unit arranged to act on the said differentially acting pulley system.

6. A brick-handling apparatus according to claim 1, in which the platen members carry vacuum pickup pads adapted for engaging and picking up a selected number of bricks from a line of bricks at the pickup station and for setting the bricks down in a line at the release station, wherein the platen members are pivoted to the separable support brackets so that they are capable of movement through 90° between a horizontal plane and a vertical plane to permit the bricks carried thereby to be selectively set down at the release station either on their edges or their faces.

7. A brick-handling apparatus according to claim 1, including at the pickup station a main support carrying a line of support members, means for feeding bricks in abutting end-to-end relationship longitudinally onto the support from one end of the line of members, stop means for arresting the movement of the bricks when the leading brick reaches the furthest support member, each support member being positioned for a supporting a respective brick, separating means for producing a uniform separation of the support members when the bricks are supported thereby so as to space apart the bricks to positions corresponding to the pickup positions of the aligned platen members on their support.

8. A brick-handling apparatus according to claim 7, wherein the separating means includes a first drive member designed to move said furthest support member in the direction of feed of the bricks so as to produce an initial separation of the support members, and for stopping said movement when the brick supported by said furthest support member occupies a position corresponding to the pickup position of the respective platen member, so as to hold the support member in this position, a second drive member designed to move the support member at the opposite end of the line in the opposite direction to produce a further separation of the support members, and for arresting said movement when the brick supported by said opposite end support member occupies a position corresponding to the pickup position of the respective platen member, and means coupling the support members which permits them to be separated but maintains a uniform spacing between them.

9. A brick-handling apparatus according to claim 8, including switch means position so as to be engaged and actuated by the brick carried by said opposite end support member when the brick reaches a position corresponding to the pickup position of the respective platen member, the actuation of which switch terminates the operation of said second drive member.

10. A brick-handling apparatus according to claim 9, wherein adjacent pairs of supports are connected by equally tensioned spring couplings.

* * * * *